United States Patent
Higashi

(10) Patent No.: US 7,690,797 B2
(45) Date of Patent: Apr. 6, 2010

(54) PROJECTOR AND FOCUS ADJUSTMENT METHOD

(75) Inventor: Hideaki Higashi, Tokyo (JP)

(73) Assignee: Nec Viewtechnology, Ltd., Tokyo (JP)

( * ) Notice: Subject to any disclaimer, the term of this patent is extended or adjusted under 35 U.S.C. 154(b) by 854 days.

(21) Appl. No.: 11/447,144

(22) Filed: Jun. 6, 2006

(65) Prior Publication Data

US 2006/0285089 A1 Dec. 21, 2006

(30) Foreign Application Priority Data

Jun. 16, 2005 (JP) ............................. 2005-176164

(51) Int. Cl.
*G03B 21/14* (2006.01)
*G03B 3/00* (2006.01)

(52) U.S. Cl. ......................... 353/69; 353/101

(58) Field of Classification Search .................. 353/69, 353/70, 101, 100, 46, 122; 348/745, 806; 396/53; 73/490

See application file for complete search history.

(56) References Cited

U.S. PATENT DOCUMENTS

| | | | |
|---|---|---|---|
| 5,978,600 A * | 11/1999 | Takeuchi et al. | 396/53 |
| 5,999,746 A | 12/1999 | Kitagawa | |
| 7,270,421 B2 * | 9/2007 | Shinozaki | 353/69 |
| 2004/0041985 A1 | 3/2004 | Kimura et al. | |
| 2005/0099607 A1 | 5/2005 | Yokote et al. | |
| 2006/0103811 A1 * | 5/2006 | May et al. | 353/69 |
| 2006/0256298 A1 * | 11/2006 | Knipe | 353/69 |

FOREIGN PATENT DOCUMENTS

| | | |
|---|---|---|
| JP | 5-27153 | 2/1993 |
| JP | 2003-13118 | 5/2003 |
| JP | 2003-131118 | 5/2003 |
| JP | 2003-149729 | 5/2003 |
| JP | 2004-004284 | 1/2004 |
| JP | 2004-233115 | 8/2004 |
| WO | WO 2005/020145 A1 | 3/2005 |

OTHER PUBLICATIONS

Japanese office action dated Jul. 23, 2008 with partial English translation.
European Search Report Dated Oct. 23, 2006.

* cited by examiner

*Primary Examiner*—Georgia Y Epps
*Assistant Examiner*—Ryan Howard
(74) *Attorney, Agent, or Firm*—McGinn IP Law Group, PLLC

(57) ABSTRACT

A transportable projector includes a focus adjustment unit for moving a focus lens in a projection lens, an acceleration sensor for detecting acceleration in a direction along an optical axis of the projection lens in the projector, a determination unit for determining whether the projector is in a stationary state or in a moving state in accordance with an output of the acceleration sensor and for respectively determining the direction to which the projector has moved and the distance that the projector has moved in accordance with an output of the acceleration sensor, and a control unit for controlling movement of the focus lens by the focus adjustment unit in accordance with the determined direction and the determined distance of the projector.

20 Claims, 8 Drawing Sheets

Near end side

Far end side

PROJECTOR AND FOCUS ADJUSTMENT METHOD

BACKGROUND OF THE INVENTION

1. Field of the Invention

The present invention relates to a projector having an autofocus function.

2. Description of the Related Art

There is provided a projector having an autofocus function. In such a projector, usually, at startup or at the time of pushing a specific button, the autofocus function operates to stop a focus lens at a position where an image projected on a screen is in focus. An operator can set up the projector easily in a short time by using this autofocus function.

However, in setting up the projector, there is a case in that, after the focus is adjusted, the projector main body is moved toward or away from the screen to adjust the size or the like of the projected image. In this case, the operator again adjusts again the focus with the autofocus function by pushing the specific button or the like after the projector main body has been moved.

The operation for readjusting the focus, as described above, is annoying for some operators. Therefore, there is proposed a projector in which the focus can be automatically readjusted (see Japanese Patent Laid-Open No. 2003-131118). This projector includes a motion detection sensor for detecting whether the projector is a moving state or a stationary state, a motion determination unit for detecting when the state of the projector changes from the moving state to the stationary state, and a focus control unit for operating the autofocus function when the state of the projector changes from the moving state to the stationary state.

However, there are following problems in the projector disclosed in Japanese Patent Laid-Open No. 2003-131118.

In order set up the projector in a shorter time, the focus is desirably readjusted in a minimal time. In the projector disclosed in Japanese Patent Laid-Open No. 2003-131118, because the focus is automatically readjusted by the autofocus function after the projector becomes the stationary state, no operation for effecting the autofocus function is needed. However, the amount of time that is required from starting the autofocus function until focus is achieved is basically equal to the amount of time that it takes the user to push the bottom to start the autofocus function, and improvement have not yet been introduced from the standpoint of being able to readjust the focus in a short time.

There is a method that focus is always adjusted by the autofocus function, as a technique for attaining the above-mentioned improvement. In order to measure the distance toward the screen, for example, infrared rays are radiated. However, when infrared rays radiated from a range sensor on the projector side (a sensor for measuring a projection distance [a distance from a projection lens to the screen]) are cut off by someone or something, unnecessary focus adjustment is performed. Accordingly, it takes a time to readjust the focus.

SUMMARY OF THE INVENTION

Accordingly, it is an object of the present invention to solve the above-mentioned problems and to provide a projector that can readjust the focus in a short time.

To attain the object, the present invention includes:

a projection lens in which a focus lens is movable along an optical axis;

a focus adjustment unit for moving a position of the focus lens;

an acceleration sensor for detecting acceleration of a housing in which the projection lens is arranged;

a determination unit for determining whether the housing is in a stationary state or in a moving state in accordance with an output of the acceleration sensor and for respectively determining a direction to which the housing has moved and a distance that the housing has moved in accordance with an output of the acceleration sensor when the housing is in the moving state; and a control unit for determining a direction and a distance that the focus lens is to be moved in accordance with the determined direction and the determined distance of the housing, and for controlling movement of the focus lens by the focus adjustment unit in accordance with the determined direction and the determined distance of the focus lens.

With the above-mentioned arrangement, for example, when the projector is moved in the direction approaching the screen after the autofocus process is performed, the determination unit detects the movement of the projector (housing) and determines the direction and the distance that the projector (housing) has moved. Then, the control unit determines the direction and the distance that the focus lens is to be moved in accordance with the determined direction and the determined distance of the projector (housing) and moves the focus lens in accordance with the determined direction and the determined distance of the focus lens. In this way, by moving the focus lens with prediction control, the position of the focus lens, after the projector has been moved, is closer to the position of focus lens in which the projected image is in focus than to the position of the focus lens before the projector was moved. Accordingly, the time required for the autofocus process after moving the projector can be shortened.

According to the present invention, because the focus lens starts to move, based on prediction control, while the projector starts to move, it is possible to shorten the time that is needed for the autofocus process to operate after the projector has moved. Therefore, the focus can be adjusted at higher speed than the projector disclosed in Japanese Patent Laid-Open No. 2003-131118.

The above and other objects, features, and advantages of the present invention will become apparent from the following description with reference to the accompanying drawings which illustrate examples of the present invention.

DESCRIPTION OF THE PREFERRED EMBODIMENTS

First Embodiment

Figure 1:
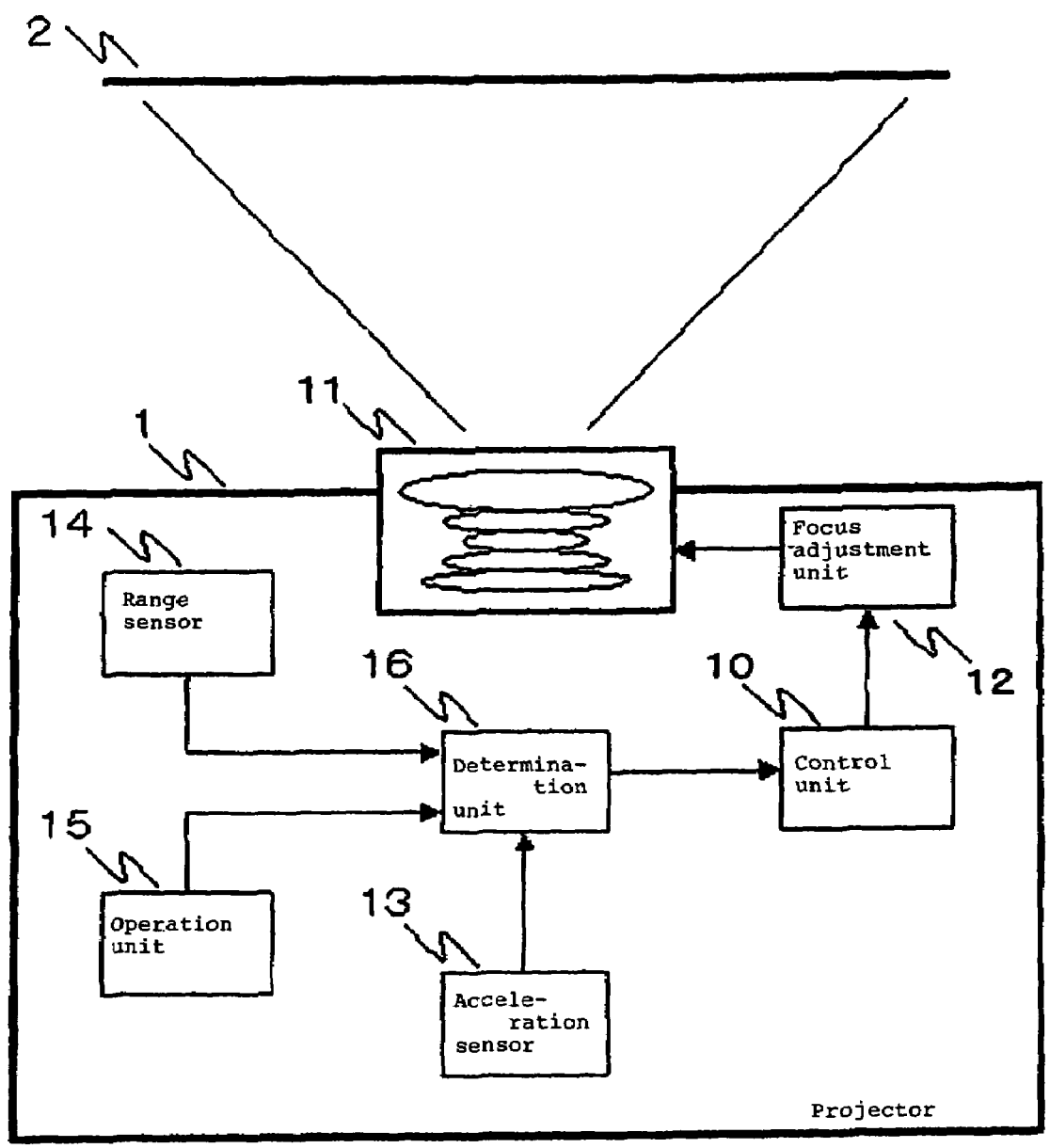
FIG. 1 is a block diagram showing a configuration of a projector according to a first embodiment of the present invention.

FIG. 1 is a block diagram showing a configuration of a projector according to the first embodiment of the present invention. Referring to FIG. 1, projector 1 according to the first embodiment is a transportable projector and includes control unit 10, lens unit 11, focus adjustment unit 12, acceleration sensor 13, range sensor 14, operation unit 15, and determination unit 16. In addition, projector 1 also includes the existing elements for carrying out functions as a projector, such as a light source, a display device that reflects or transmits beams from the light source and that is typified by a liquid crystal device, an image processing unit for applying image processes (such as A/D conversion, synchronization signal separation, rewriting and reading data to/from a frame memory) to video signals from the outside, and a driving unit for driving the display device in accordance with image data from the image processing unit, not shown. Since these existing elements are well known, explanations thereof are omitted in this description.

Projection lens 11 includes a plurality of lenses for projecting an image formed by a light valve on screen 2. A single or group of lens moves along an optical axis backward and forward, thereby adjusting a focal position on screen 2. As a mechanism for adjusting the focal position, various mechanisms, such as a mechanism in which whole projection lens 11 moves, a mechanism in which a part of projection lens 11 moves, can be applied, however, in this description, a widely-used mechanism in which a front lens (focus lens) of the projection lens is movable is used.

Focus adjustment unit 12 includes a lens motor for moving lenses in projection lens 11 and controls the driving of the lens motor in accordance with a control signal from control unit 10.

Acceleration sensor 13 detects acceleration (which is time rate of change of velocity) applied to projector 1 (a housing in which projector lens 11 is arranged), more specifically, acceleration applied to projector 1 in a direction along the optical axis of projection lens 11. As acceleration sensor 13, a uniaxial acceleration sensor or a multi-axis acceleration sensor may be used. When the uniaxial acceleration sensor is used, the acceleration sensor is preferably arranged such that the detection direction of the acceleration is along the optical axis of projection lens 11. When the multi-axis acceleration sensor is used, the acceleration sensor is preferably arranged such that the acceleration applied to projector 11 in the direction along the optical axis of projection lens 11 can be detected in any axis. Outputs from acceleration sensor 13 are supplied to determination unit 16.

Range sensor 14 measures a distance (projection distance) from the front surface (projection lens) of projector 1 to screen 2. As range sensor 14, for example, it is possible to use an existing range sensor that detects a reflected light from an object to be measured by radiating infrared rays and that measures a projection distance in accordance with the detection result by using the triangulation principle. Outputs from range sensor 14 are supplied to control unit 10 through determination unit 16.

Operation unit 15 is a portion where a plurality of buttons and a plurality switches that are used to operate projector 1 are arranged. As a switch, for example, a startup button that is used to start up projector 1 is mentioned. As an operation button, for example, a function button used to operate each function in projector 1 is mentioned. Function buttons include an autofocus function bottom that is used to start up the autofocus function. The operator can start up projector 1 and operate each function through operation unit 15. Outputs from operation unit 15 are supplied to control unit 10 through determination unit 16.

Determination unit 16 determines whether the state of projector 1 is the stationary state or the moving state in accordance with the output from acceleration sensor 13 (the detection result of acceleration applied to projector 1) when an input operation for starting the autofocus function is performed in operation unit 15, and supplies the determination result to control unit 10. Also, when determination unit 16 determines that the state of projector 1 is the moving state, determination unit 16 determines which direction and how much projector 1 moves forward (in the direction toward screen 2) or backward (in the direction away from screen 2) along the optical axis of projection lens 11 in accordance with the output from acceleration sensor 13. The determination results of the moving direction and the moving amount are supplied to control unit 10.

Specifically, determination unit 16 determines the stationary state or moving state and determines the moving direction and moving amount, as follows.

Figure 2:
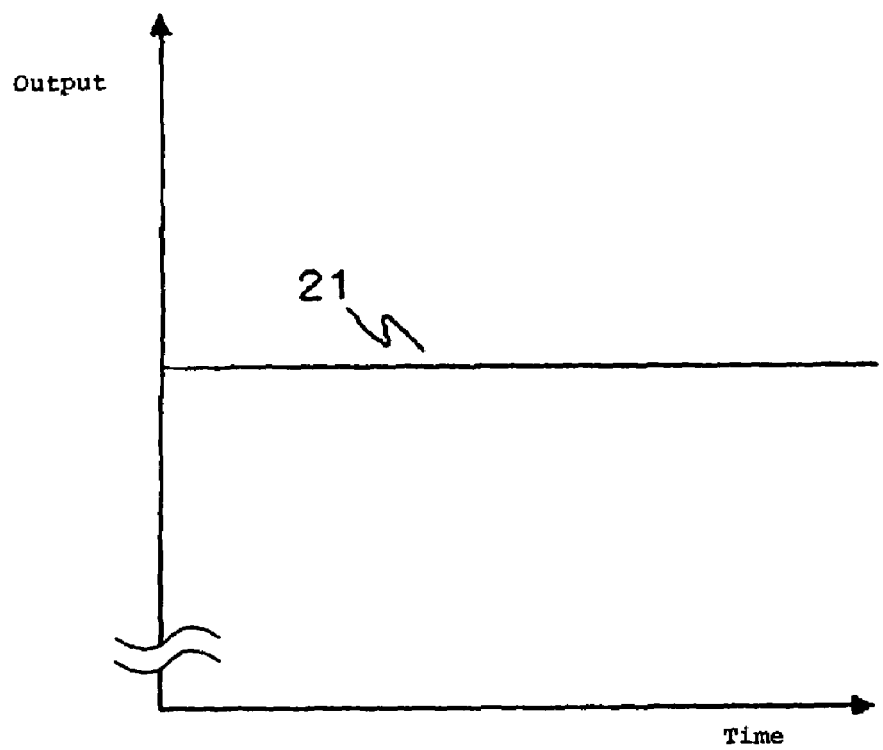
FIG. 2 is a waveform chart showing one example of an output waveform of an acceleration sensor when the projector shown in FIG. 1 is in a stationary state.
Figure 3:
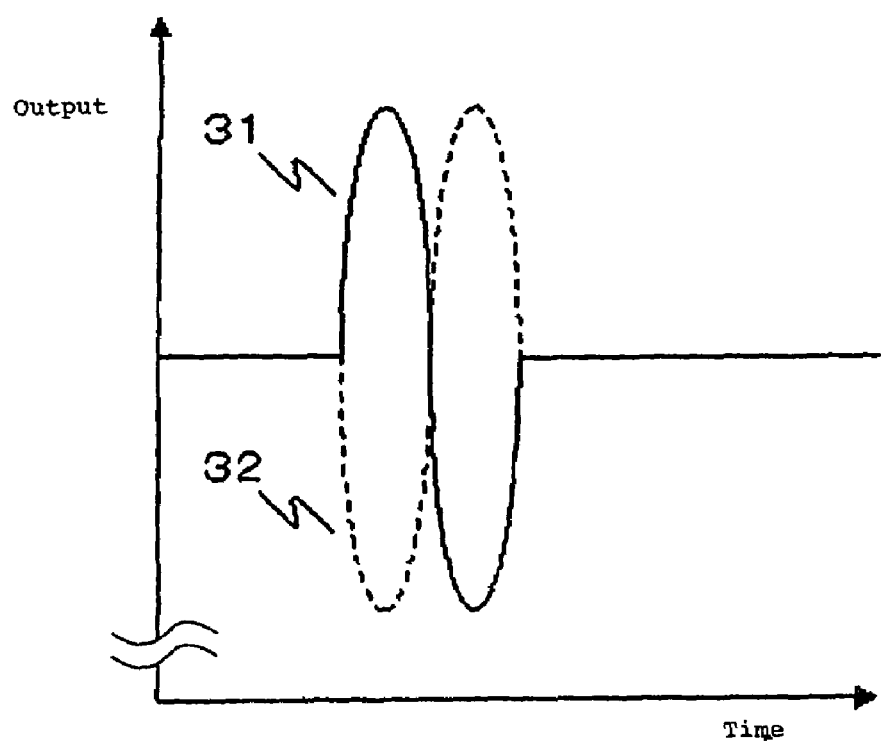
FIG. 3 is a waveform chart showing one example of an output waveform of the acceleration sensor when the projector shown in FIG. 1 is moved along an optical axis of a projection lens.

FIG. 2 shows an output waveform of acceleration sensor 13 when projector 1 is in the stationary state, and FIG. 3 shows an output waveform of acceleration sensor 13 when projector 1 is moved along the optical axis of projection lens 11. When projector 1 is in the stationary state, the output from acceleration sensor 13 becomes waveform 21 at a constant level as shown in FIG. 2. On the other hand, when projector 1 is in the moving state, the output from acceleration sensor 13 becomes a waveform as shown in FIG. 3. In FIG. 3, waveform 31 indicated by a solid line represents an output waveform when projector 1 moves forward (in the direction toward screen 2), and waveform 32 indicated by a dashed line represents an output waveform when projector 1 moves backward (in the direction away from screen 2).

Determination unit 16 determines that projector 1 is in the stationary state when the output from acceleration sensor 13 is the waveform at the constant level shown in FIG. 2 and determines that projector 1 is in the moving state when the output waveform from acceleration sensor 13 is waveform 31 or waveform 32 shown in FIG. 3. Also, determination unit 16 determines that projector 1 moves forward (in the direction toward screen 2) when the output waveform from acceleration sensor 13 is a waveform with a rising edge at the beginning of the waveform, like waveform 31. On the other hand, determination unit 16 determines that projector 1 moves backward (in the direction away from screen 2) when the output waveform from acceleration sensor 13 is a waveform with a falling edge at the beginning of the waveform, like waveform 32.

Further, the moving distance can be obtained by second integrating the acceleration. Determination unit 16 samples output waveforms (waveform 31 or 32 in FIG. 3) from acceleration sensor 13 when projector 1 moves at a predetermined cycle, second integrates the waveforms, and sequentially supplies the integral (moving amount) to control unit 10.

Control unit 10 controls the whole operation of projector 1 in accordance with the input operation through operation unit 15 by the operator, and further performs the autofocus process when projector 1 is in the stationary state. In this autofocus process, control unit 10 supplies focus adjustment unit 12 with a control signal for moving the focus lens to the position where the image projected on screen 2 is in focus in accordance with the measurement result (projection distance) supplied from range sensor 14.

Also, when projector 1 moves after the autofocus process has started, control unit 10 performs the process by which the focus lens moves while projector 1 moves. In the process by which the focus lens moves, control unit 10 calculates the distance that the focus lens is to be moved in accordance with the preset magnification of projection lens 11, the direction to which projector 1 has moved and the distance that projector 1 has moved (which are supplied from determination unit 16), and the projection distance obtained from range sensor 14 before projector 1 moves and after the autofocus process is performed. Control unit 10 supplies focus adjustment unit 12 with a control signal for making the focus lens in projection lens 11 to the position in focus after moving projector 1 in accordance with the calculated distance. In this description, the distance that the focus lens is to be moved corresponds to the distance from the position of the focus lens, before projector 1 moves, to the position in focus after projector 1 moves.

Figure 4:
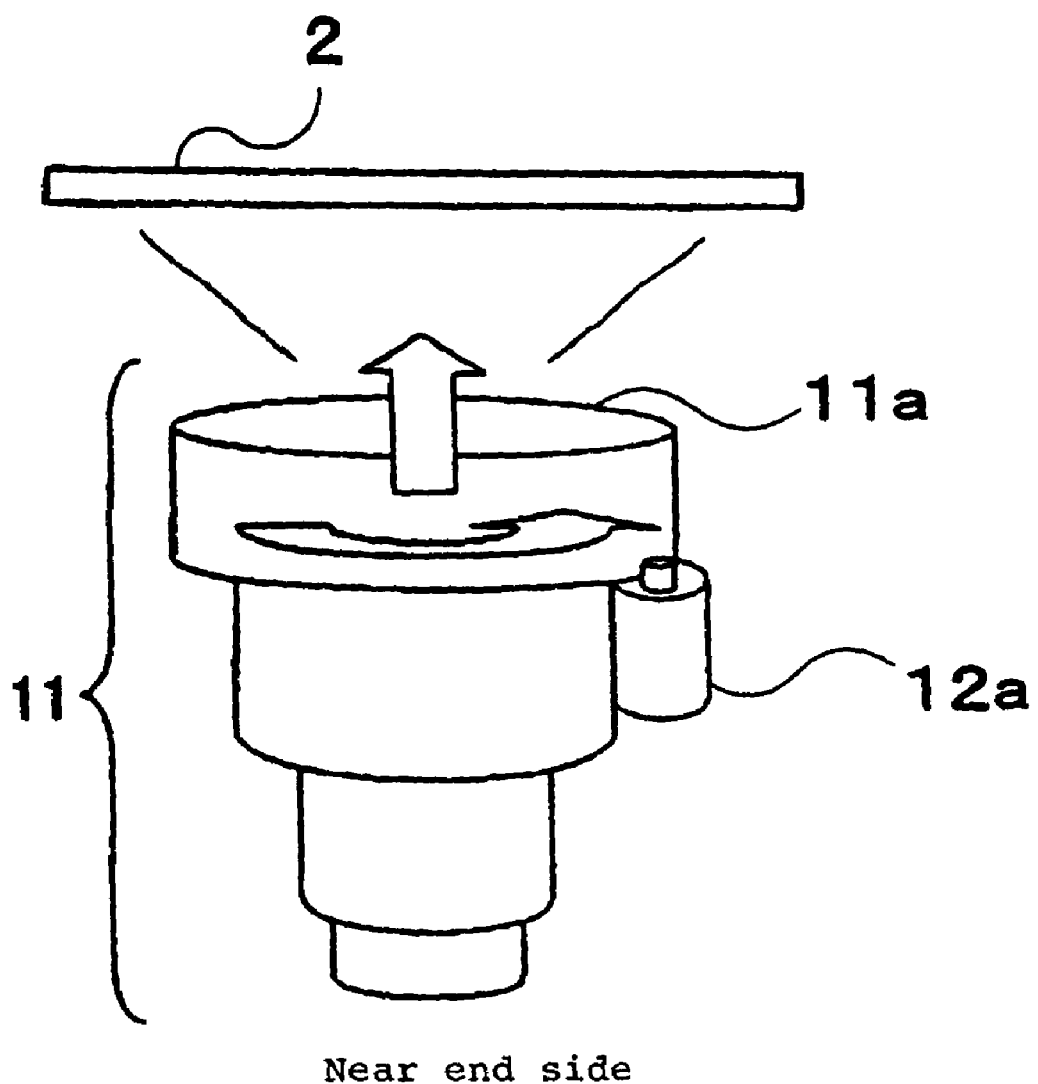
FIG. 4 is a schematic view for explaining a control operation of a lens motor to a "Near" end side when the projector shown in FIG. 1 is moved toward the front.
Figure 5:
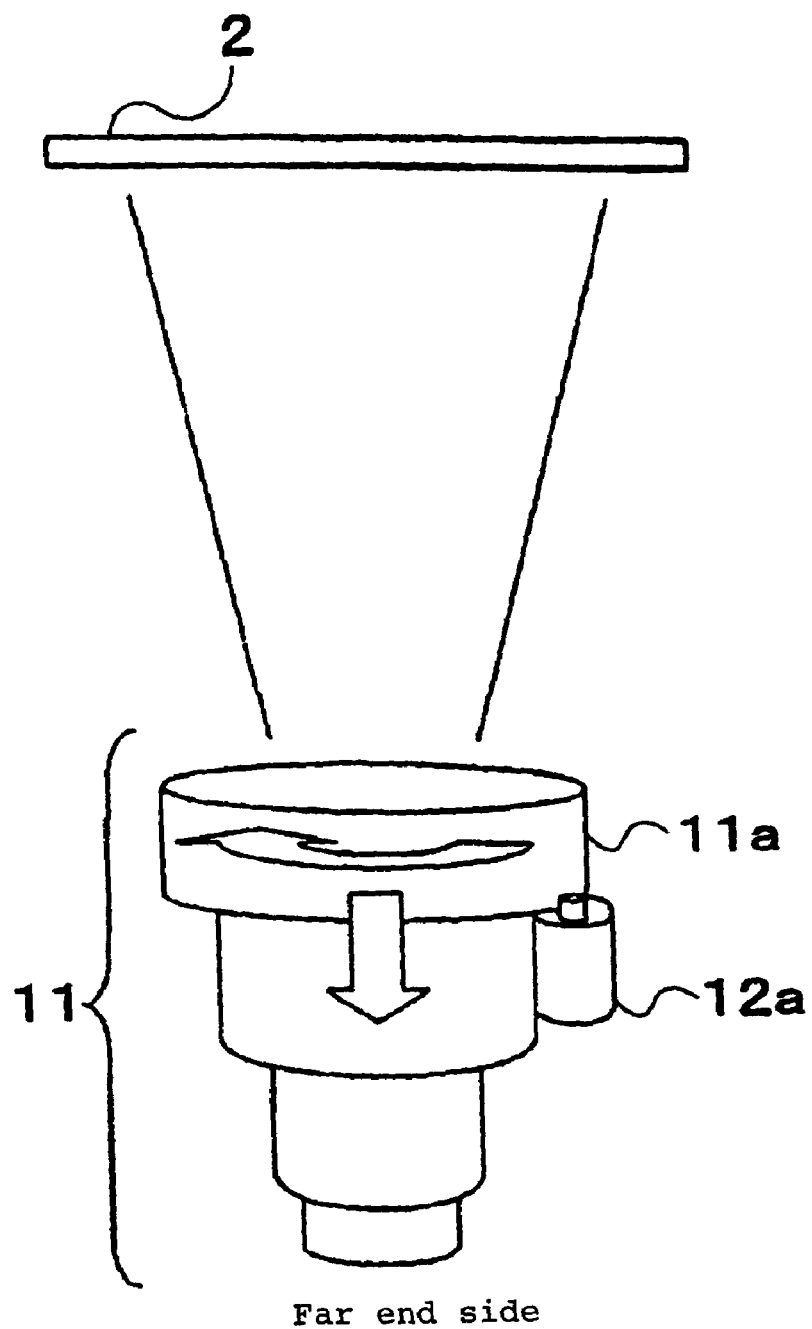
FIG. 5 is a schematic view for explaining a control operation of a lens motor to a "Far" end side when the projector shown in FIG. 1 is moved toward the rear.

FIG. 4 schematically shows the control operation of the lens motor to the "Near" end side when projector 1 moves forward, and FIG. 5 schematically shows the control operation of the lens motor to the "Far" end side when projector 1 moves backward. In FIGS. 4 and 5, projection lens 11 is structured such that a front lens (focus lens) moves forward and backward along the optical axis by rotating focus ring 11a arranged at the top portion thereof. Lens motor 12a is used to rotate focus ring 11a, and the driving of lens motor 12a is controlled, thereby controlling the rotation of focus ring 11a. When projector 1 is moved forward, control unit 10 performs the control for driving the focus lens to the "Near" end side so that focus ring 11a moves forward, as shown in FIG. 4. On the other hand, when projector 1 is moved backward, control unit 10 performs the control for driving the focus lens to the "Far" end side so that focus ring 11a moves backward, as shown in FIG. 5.

Next, the operation of projector 1 is specifically explained. In this description, explanations are given of a series of focus adjustment operations including the autofocus process in the stationary state and the process by which the focus lens moves in the moving state. The other operations are similar to those of an existing projector, and thus explanations thereof are omitted.

Figure 6:
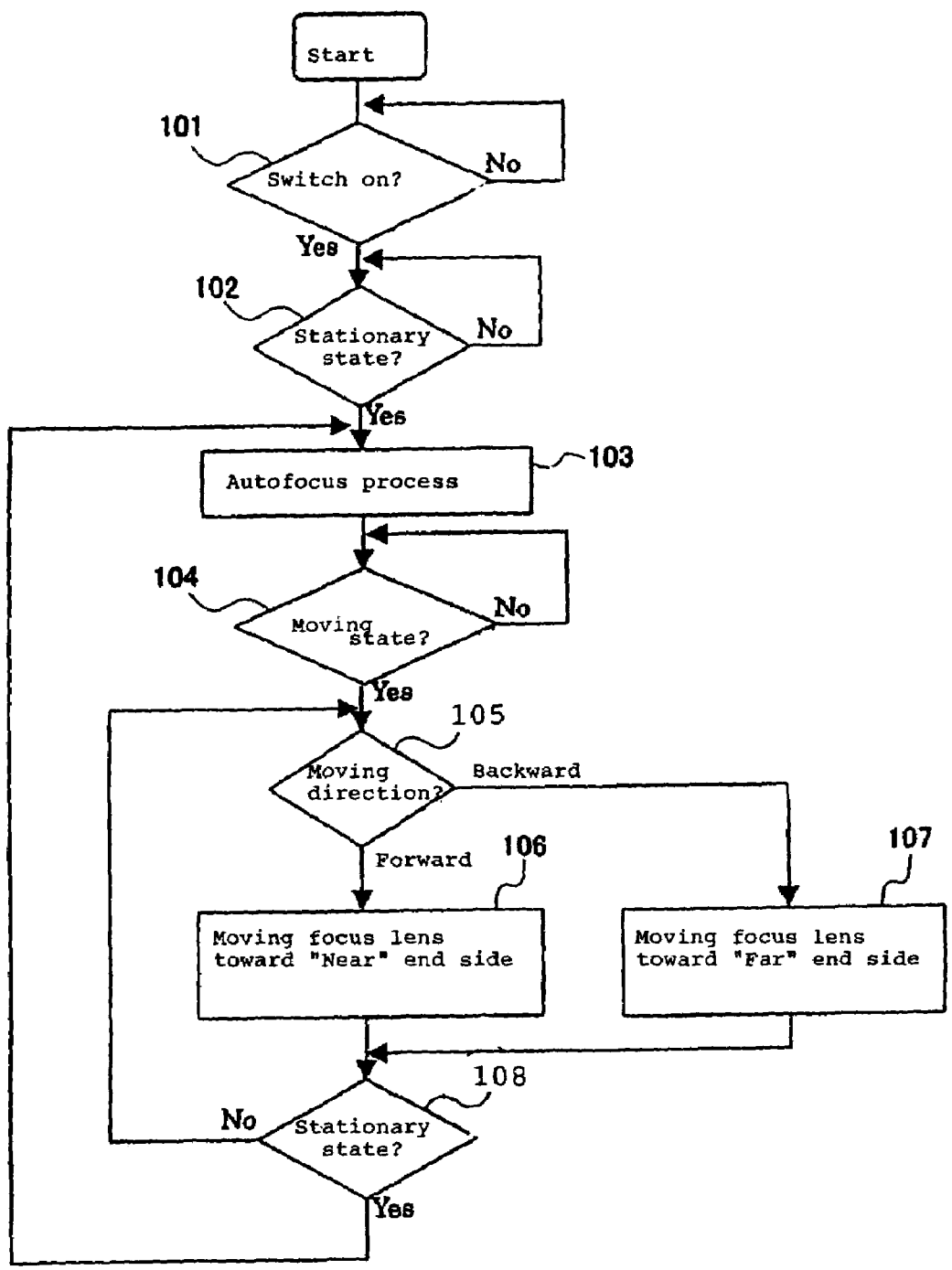
FIG. 6 is a flow chart showing one procedure of a focus adjustment process that is performed in the projector shown in FIG. 1.

When the operator arranges projector 1 at a desirable distance away from screen 2 and turns on the startup switch by operation unit 15 of projector 1, an image is projected on screen 2. Then, when the autofocus function button is pushed, the focus adjustment process for adjusting the focus of the image projected on screen 2 is performed in projector 1. FIG. 6 shows one procedure of the focus adjustment process.

First, determination unit 16 determines whether or not the autofocus function button is pushed in accordance with the output from operation unit 15 (step 101). When the autofocus function button is pushed, determination unit 16 determines whether or not projector 1 is in the stationary state in accordance with the output from acceleration sensor 13 (step 102). When projector 1 is in the stationary state, determination unit 16 supplies control unit 10 with the determination result indicating that projector 1 is in a stationary state.

When the determination result indicating the stationary state of projector 1 is supplied from determination unit 16 to control unit 10, control unit 10 supplies focus adjustment unit 12 with the control signal for moving the focus lens to the position where the image projected on screen 2 is in focus, in accordance with the output from range sensor 14, and performs the autofocus process (step 103).

After the autofocus process is performed, determination unit 16 determines whether or not projector 1 changes from the stationary state to the moving state based on the output from acceleration sensor 13 (step 104). When the state of projector 1 changes from the stationary state to the moving state, determination unit 16 determines whether projector 1 moves forward or backward in accordance with the output waveform of acceleration sensor 13 (step 105). When projector 1 moves forward, determination unit 16 supplies control unit 10 with a signal indicating the forward movement and the moving amount thereof. When projector 1 moves backward, determination unit 16 supplies control unit 10 with a signal indicating the backward movement and the moving amount thereof.

When the signal indicating the forward movement and the distance that projector 1 has moved is supplied from determination unit 16 to control unit 10, control unit 10 calculates the distance that the focus lens is to be moved in accordance with the supplied distance, and supplies focus adjustment unit 12 with a control signal for moving the focus lens toward the "Near" end side based on the calculated amount (step 106). According to this operation, the focus lens moves to the "Near" end side. When the signal indicating the backward movement and the distance that projector 1 has moved is supplied from determination unit 16 to control unit 10, control unit 10 calculates the distance that the focus lens is to be moved in accordance with the supplied distance, and supplies focus adjustment unit 12 with a control signal for moving the focus lens toward the "Far" end side based on the calculated amount (step 107). According to this operation, the focus lens moves to the "Far" end side.

After step 106 or 107, determination unit 16 determines whether or not projector 1 is in the stationary state in accordance with the output from acceleration sensor 13 (step 108). When projector 1 reaches the stationary state, control unit 10 returns to step 103 and performs the autofocus process. When determination unit 16 determines that projector 1 continues in the moving state in step 108, the process is returned to step 105 and determination unit 16 determines the moving direction and the moving amount.

According to the above-mentioned focus adjustment operation, after the autofocus process is performed, when projector 1 is moved toward screen 2, the control for driving the focus lens to the "Near" end side is performed while projector 1 is moving. Based on this control, the position of the focus lens, after projector 1 has been moved, is closer to the position of the focus lens in which the projected image is in focus than to the position of the focus lens before the projectors was moved. Accordingly, it is possible to shorten the time required for the autofocus process that is performed after projector 1 moves. Also, after the autofocus process is performed, when projector 1 is moved away from screen 2, the control for driving the focus lens to the "Far" end side is performed while projector 1 is moving. In this case, the position of the focus lens, after projector 1 has been moved, is closer to the position of the focus lens in which the projected image is in focus than to the position of the focus lens before the projectors was moved. Accordingly, it is possible to shorten the time required for the autofocus process that is performed after projector 1 moves.

According to the projector of the first embodiment, the control for driving the lens motor is started while the projector starts to move, thereby producing the effect of enabling high-speed focus adjustment. This effect becomes more remarkable, for example, when a projector is large and heavy, when the focus is finely adjusted, and when the lens moving time from the "Near" end to the "Far" end is long. Also, the longer the time it takes projector 1 to reach the stationary state, the greater the effect.

In the above-mentioned projector according to the first embodiment, determination unit 16 may eliminate a weak signal (noise) that is included in the output signal from acceleration sensor 13 and that is caused by a trace of vibration generated when the switch or the like in operation unit 15 is operated. To eliminate this noise, for example, the amplitude of the output waveform (voltage) of acceleration sensor 13 is compared with a reference voltage that is previously set, and it is determined that the signal of the output waveform is noise when the amplitude of the output waveform is smaller than the reference voltage. Also, as to a digital signal obtained by A/D converting the output (analog) from acceleration sensor 13, a signal not more than a predetermined threshold may be eliminated as a noise. Further, in this case, a digital signal whose pulse width is not more than a constant value may be treated as noise. In this way, determination unit 16 eliminates the weak signal caused by the trace of vibration included in the output from acceleration sensor 13, thereby suppressing the effect caused by the vibration that is generated when the switch in operation unit 15 is operated.

Also, when the size or the like of the projected image is adjusted by moving projector 1, projector 1 is moved back and forth. For example, there is a case in that the operation for moving projector 1 forward and then backward is performed as a series of moving operations. In such a case, determination unit 16 and control unit 10 may operate as follows.

When projector 1 moves back and forth, the output waveform of acceleration sensor 13 changes from waveform 31 to waveform 32 (or from waveform 32 to waveform 31) shown in FIG. 3. First, determination unit 16 detects a rising edge (or falling edge) immediately after the output waveform is changed and supplies control unit 10 with a timing signal to control the direction of focus lens driven by the lens motor. Then, control unit 10 changes the rotation direction of the lens motor (change of the control for driving the focus lens to the "Near" end side and the control for driving the focus lens to the "Far" end side) in accordance with the timing signal from determination unit 16. In this operation, even if projector 1 moves back and forth, the position of the focus lens after projector 1 has moves (i.e., the position of the focus lens at the time when the autofocus process starts) can be made close to the position of the focus lens when the projected image in focus.

Second Embodiment

In the configuration shown in FIG. 1, when projector 1 is arranged such that the optical axis of projection lens 11 is vertical to the surface of screen 2, a rectangular image in which the top-and-bottom and right-and-left of the projection screen are even is projected on screen 2. On the other hand, when projector 1 is arranged such that the optical axis of projection lens 11 tilts relative to the surface of screen 2, a keystone distortion is generated in the image projected on screen 2. In the second embodiment, explanations are given of an example in which a function for correcting the keystone distortion (keystone distortion correction process) together with the autofocus process is added to the projector according to the first embodiment, as described above.

Figure 7:
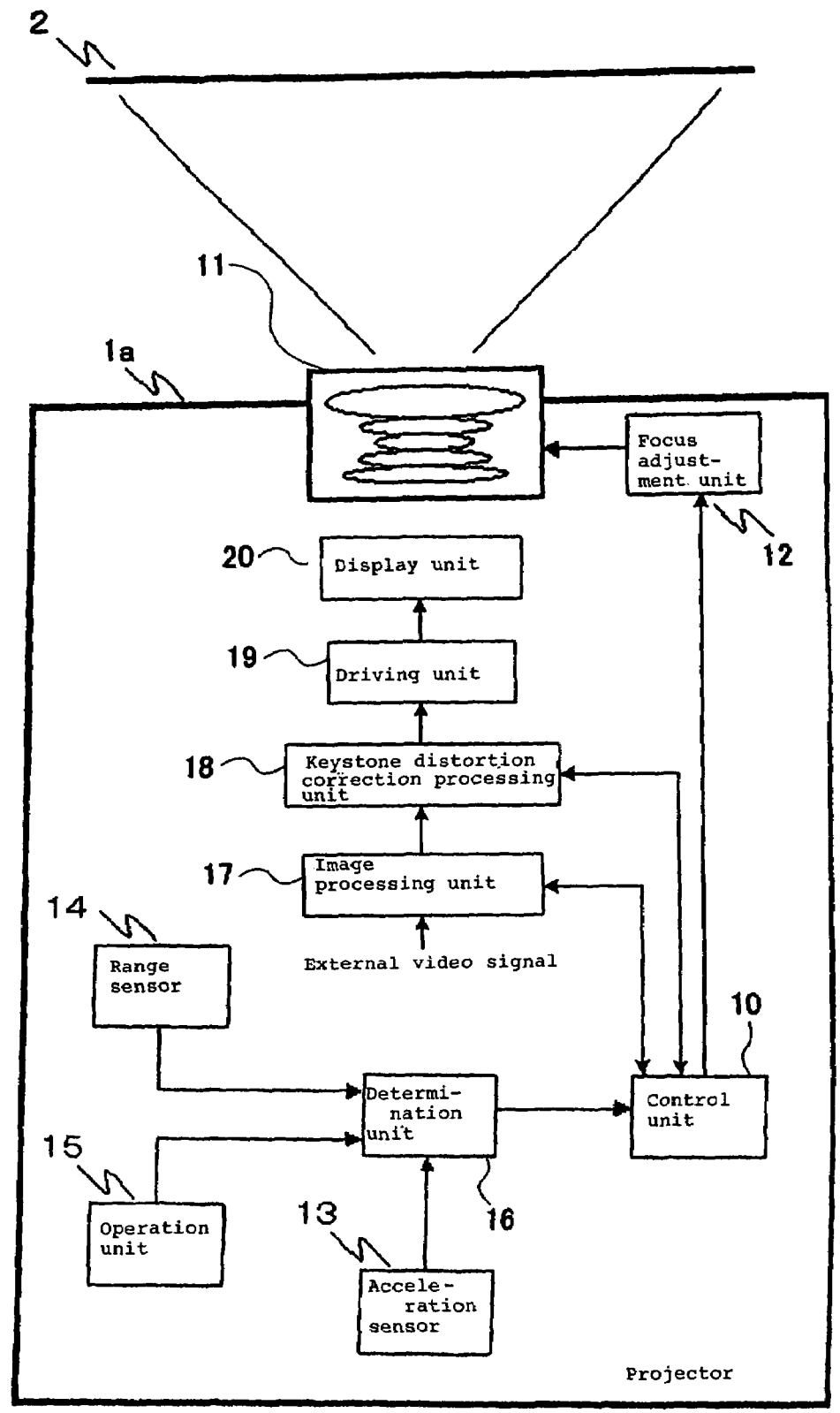
FIG. 7 is a block diagram showing a configuration of a projector according to a second embodiment of the present invention.

FIG. 7 is a block diagram showing a configuration of a projector according to the second embodiment of the present invention. In FIG. 7, the same reference numerals are applied to the same elements as in FIG. 1. Projector 1a according to the second embodiment, as shown in FIG. 7, includes image processing unit 17, keystone distortion correction processing unit 18, driving circuit 19, and display device 20 in addition to the configuration shown in FIG. 1.

Display device 20 is a display device that partially reflects and transmits rays of light from a light source, not shown, and that is represented by a liquid crystal device. Driving circuit 19 drives display device 20 in accordance with digital image data supplied from image processing unit 17 through keystone distortion correction processing unit 18. The image generated by display device 20 is projected on screen 2 by projection lens 11.

Image processing unit 17 includes elements required for the image process, such as a synchronization signal separation unit for separating the synchronization signal from an external video signal (including analog image data and a synchronization signal), an A/D conversion unit for converting the analog image data in the external video signal, and a memory unit (for example, a frame memory) stored with the A/D converted image data. The synchronization signal separated in the synchronization signal separation unit is supplied to control unit 10. In image processing unit 17, analog image data from the outside is converted into digital image data to be stored in the memory unit, and the digital image data is read from the memory unit in accordance with the control signal from control unit 10 and is supplied to keystone distortion correction processing unit 18.

Keystone distortion correction processing unit 18 starts in accordance with the control signal from control unit 10, and makes a keystone distortion correction for the digital image data supplied from image processing unit 17 in accordance with angle information (determination result) of projector 1a supplied from determination unit 16 through control unit 10. In this keystone distortion correction, the digital image data supplied from image processing unit 17 is corrected in accordance with the angle of projector 1a (angles in the elevation angle direction and in the depression angle direction) such that the projection image area on screen 2 becomes an approximate rectangle.

Figure 8:
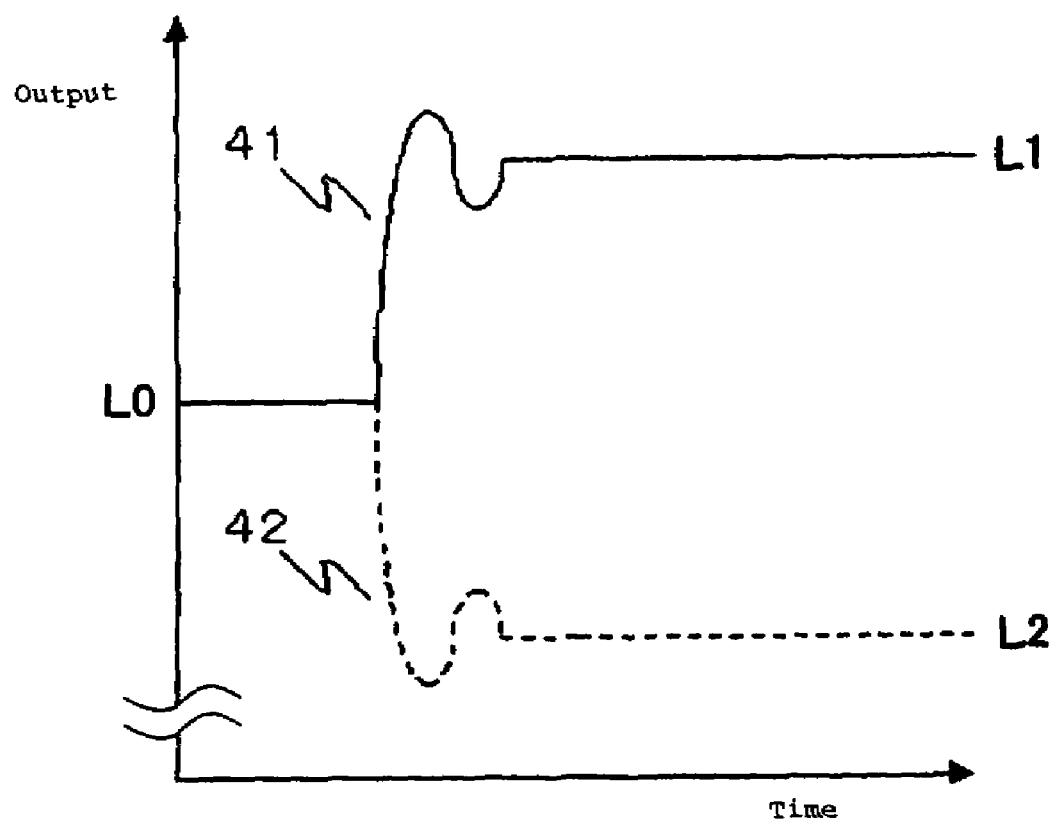
FIG. 8 is a waveform chart showing one example of an output level of the acceleration sensor in the projector shown in FIG. 7.

Determination unit 16 determines the angle of projector 1a (angles in the elevation angle direction and in the depression angle direction) in accordance with the output level of acceleration sensor 13, in addition to determining the movement of projector 1a for the focus adjustment operation, as explained in the first embodiment. FIG. 8 shows one example of the output level of acceleration sensor 13. In FIG. 8, waveform 41 indicated by a solid line is a waveform when the angle of projector 1a is changed such that the image is raised in the elevation angle direction, and waveform 42 indicated by a dashed line is a waveform when the angle of projector 1a is changed such that the image is lowered in the depression angle direction. When the image is raised in the elevation angle direction, the output level from acceleration sensor 13 increases from level L0 to level L1. On the other hand, when the image is lowered in the depression angle direction, the output level from acceleration sensor 13 decreases from level L0 to level L2. Therefore, the change in the angle of projector 1a (angles in the elevation angle direction and in the depression angle direction) can be determined from the change in the output level of acceleration sensor 13.

Also, the amount of change in the output level of acceleration sensor 13 corresponds to the angle of projector 1a. For example, the angle in the elevation angle direction is made larger, the amount of change (=L1-L0) in the output level of acceleration sensor 13 becomes larger. Therefore, the current angle after projector 1a moves can be determined based on the amount of change in the output level of acceleration sensor 13. In the second embodiment, a relationship between the output level of acceleration sensor 13 and the angle of projector 1a is previously obtained, the obtained relationship is stored as table information in a memory, not shown. Determination unit 16 determines the change of the output level from acceleration sensor 13 before and after projector 1a moves, and determines the angle after projector 1a moves in accordance with the amount of change and the table information stored in the memory when the output level changes. This angle change determination result is supplied to control unit 10.

Control unit 10 supplies image processing unit 17 with a control signal for reading the digital image data from the memory unit in accordance with the synchronization signal supplied from the synchronization signal separation unit and supplies keystone distortion correction processing unit 18 with the angle change determination result from determination unit 16 to perform the keystone distortion correction process in addition to the control for the focus adjustment operation, as explained in the first embodiment.

Next, the operation of projector 1a is explained.

Figure 9:
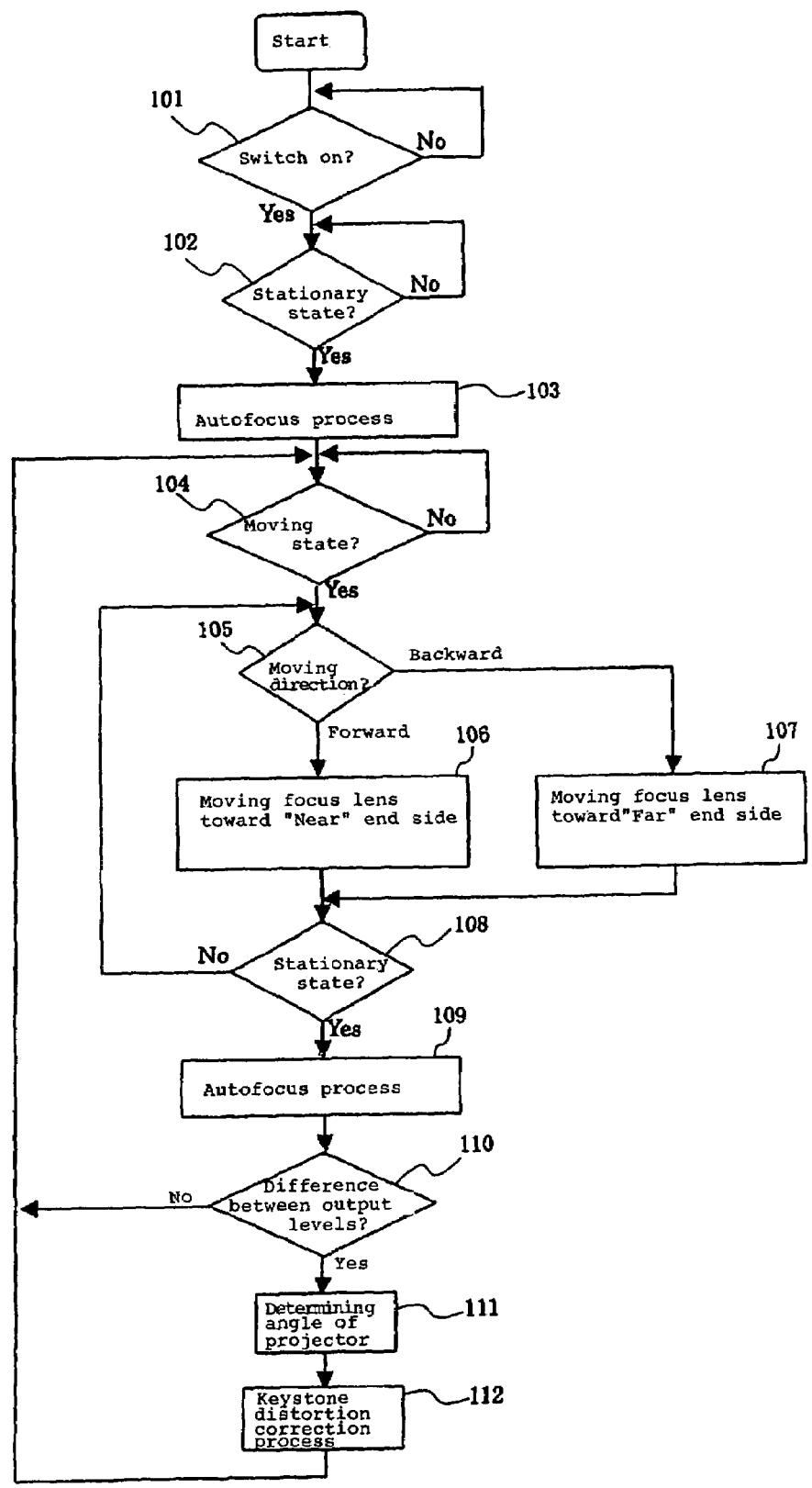
FIG. 9 is a flow chart showing one procedure of a keystone distortion correction process in synchronization with a focus process performed in the projector shown in FIG. 7.

The operator arranges projector 1a at a desirable distance away from screen 2 and turns on the startup switch for operation unit 15 in projector 1a, an image is projected on screen 2. Then, in projector 1a, the autofocus function button is pushed, the focus adjustment process for projecting the image on screen 2 in focus is performed, and the keystone distortion correction process is performed together with the focus adjustment process. FIG. 9 shows one procedure of the keystone distortion correction process together with the focus adjustment process.

Referring to FIG. 9, the operation of steps 101 to 108 is performed, similarly to the procedure shown in FIG. 6. However, in determining of the moving state in step 104, determination unit 16 holds the output level of acceleration sensor 13 before projector 1a is moved In step 108, when determination unit 16 determines that projector 1a is in the stationary state, in step 109, control unit 10 performs the autofocus process. After the autofocus process, in step 110, determination unit 16 holds the output level of acceleration sensor 13 after projector 1a moves, and determines whether or not a difference exists between the held output level in step 110 and the output level, which is held in step 104, of acceleration sensor 13 before projector 1a is moved. When a difference exists between output levels before and after projector 1a is moved, in step 111, determination unit 16 determines the angle after projector 1a moves in accordance with the difference of output levels. Then, in step 112, control unit 10 supplies keystone distortion correction processing unit 18 with the angle after projector 1a is moved, which is determined in determination unit 16, to perform the keystone distortion correction process. After the keystone distortion correction process is performed, the process is returned to step 104.

When a difference doesn't exist between the output levels before and after projector 1a moves in step 110, the process also returns to step 104.

According to the keystone distortion correction process together with the focus process, as described above, the focus can be readjusted in a short time when projector 1a is moved forward and backward, and further a squarer projection image area can be provided by the keystone distortion correction process when the angle of projector 1a is changed while moving.

Additionally, since acceleration in the focus readjustment and the angle in the keystone distortion correction process can be detected by using one acceleration sensor, there is no case in which the configuration of the device becomes complex and large.

The above-explained projectors according to the first and second embodiments are examples, and the configurations and operations thereof can be changed, as appropriate. For example, screen 2 may be any structure, such as a wall, as long as an image can be projected and displayed.

In projector 1 according to the first embodiment, when screen 2 is a transportable screen, acceleration sensor 13 may be arranged on the side of screen 2 (first projector system). In this first projector system, acceleration sensor 13 is arranged to detect acceleration in the direction vertical to the surface of screen 2. Determination unit 16 determines whether screen 2 is in the stationary state or in the moving state in accordance with the output of acceleration sensor 13, and supplies the determination result to control unit 10. Also, when determination unit 16 determines that screen 2 is in the moving state, determination unit 16 determines how much and which direction screen 2 moves forward (in the direction approaching projector 1) or backward (in the direction away from projector 1) in accordance with the output of acceleration sensor 13. The procedure for determining the direction to which screen 2 has moved and the distance that screen 2 has moved is principally similar to the procedure for determining the direction to which projector 1 has moved and the distance that projector 1 has moved When determination unit 16 determines that screen 2 is in the moving state, control unit 10 determines the direction and the distance that the focus lens is to be moved based on the direction to which screen 2 has moved and the distance that screen 2 has moved, which are determined by determination unit 16, and controls the movement of the focus lens by focus adjustment unit 12 in accordance with the determined direction and the determined distance of the focus lens. The movement of the focus lens is controlled by the same procedure as the case in which the acceleration sensor is arranged on the projector side.

In projector 1 according to the first embodiment, acceleration sensors may be respectively arranged in projector 1 and screen 2 (second projector system). In this second projector system, the first acceleration sensor arranged in screen 2 detects the acceleration in the direction along an axis vertical to the projection surface of screen 2. The second acceleration sensor arranged in projector 1 detects the acceleration in the direction along the optical axis of the projection lens in projector 1 (housing in which the projection lens is arranged). Determination unit 16 determines whether screen 2 is in the stationary state or the moving state in accordance with the output of the first acceleration sensor, and determines the direction to which screen 2 has moved and the distance that screen 2 has moved in accordance with the output of the first acceleration sensor when it is determined that screen 2 is in the moving state. Also, determination unit 16 determines whether projector (housing) 1 is in the stationary state or the moving state in accordance with the output of the second acceleration sensor, and determines the direction to which projector (housing) 1 has moved and the distance that projector (housing) 1 has moved in accordance with the output of the second acceleration sensor when it is determined that projector (housing) 1 is in the moving state. When determination unit 16 determines that at least one of screen 2 and projector (housing) 1 is in the moving state, control unit 10 determines the direction and the distance which the focus lens is to be moved in accordance with the direction and the distance which are determined by determination unit 16 in the moving state, and controls the movement of the focus lens by focus adjustment unit 12 in accordance with the determined direction and distance of the focus lens.

Also, in projector 1*a* according to the second embodiment, when screen 2 is a transportable screen, acceleration sensor 13 may be arranged in screen 2 (third projector system). In this third projector system, the operation in control unit 10 and determination unit 16 for controlling the movement of the focus lens is performed similarly to the above-mentioned first projector system. The acceleration sensor outputs a signal of a different level in accordance with the angel between the axis vertical to the projection surface of screen 2 and the horizontal surface. Determination unit 16 compares output levels of the acceleration sensor before and after screen 2 moves, and when there is a difference of output levels, determines the inclination of the axis vertical to the projection surface of the screen relative to the horizontal surface in accordance with the difference. Keystone distortion correction processing unit 18 corrects the keystone distortion in accordance with the inclination determined in determination unit 16.

In projector 1*a* according to the second embodiment, when screen 2 is a transportable screen, acceleration sensors may be respectively arranged in projector 1 and screen 2 (fourth projector system). In this fourth projector system, the operation in control unit 10 and determination unit 16 for controlling the movement of the focus lens is performed similarly to the above-mentioned second projector system. The first acceleration sensor arranged in screen 2 outputs a signal of a different output level in accordance with the angle between the axis vertical to the projection surface of screen 2 and the horizontal surface, and the second acceleration sensor arranged in projector 1 outputs a signal of a different output level in accordance with the angle between the optical axis of projection lens 11 and the horizontal surface. Determination unit 16 compares output levels of the first acceleration sensor before and after screen 2 is moved, and when there is a difference of the output levels, determines a first inclination of the axis vertical to the projection surface of screen 2 relative to the horizontal surface in accordance with the difference. Also, determination unit 16 compares output levels of the second acceleration sensor before and after projector (housing) 1*a* is moved, and when there is a difference of the output levels, determines a second inclination of the optical axis of projection lens 11 relative to the horizontal surface in accordance with the difference. When determination unit 16 determines at least one of the first and second inclinations, keystone distortion correction processing unit 18 corrects the keystone distortion in accordance with the determined inclination.

In the projectors according to the first to fourth embodiments, it is possible to make an effect in which the control for driving the lens motor is started while the projector moves, thereby adjusting the focus at high speed. In particular, in a case in which the movement of the focus lens is controlled in accordance with the movement of screen 2, because screen 2 is large and heavy and it takes time to move screen 2 to a desirable position, the effects of shortening the time required for the autofocus adjustment becomes more remarkable.

While preferred embodiments of the present invention have been described using specific terms, such description is for illustrates purposes only, and it is to be understood that changes and variations may be made without departing from the spirit or scope of the following claims.

What is claimed is:
1. A projector comprising:
a projection lens of which a focus lens is movable along an optical axis;
a focus adjustment unit for moving said focus lens;
an acceleration sensor for detecting acceleration of a housing in which said projection lens is arranged;
a determination unit for determining whether said housing is in a stationary state or in a moving state in accordance with an output of said acceleration sensor, and for determining a direction to which said housing has moved and a distance that said housing has moved in accordance with an output of said acceleration sensor when said housing is in the moving state; and
a control unit for determining a direction and a distance that said focus lens is to be moved in accordance with the direction and the distance that said housing has moved, which are supplied from said determination unit and for controlling movement of said focus lens based on prediction control, while the housing moves, by said focus adjustment unit in accordance with the determined direction and the determined distance of said focus lens.

2. The projector according to claim 1, further comprising:
a range sensor that can measure a projection distance from said projection lens to a projection surface on which an image is projected by said projection lens,
wherein said control unit controls movement of said focus lens by said focus adjustment unit in accordance with the projection distance measured by said range sensor when said determination unit determines that said housing is in a stationary state.

3. The projector according to claim 1, further comprising:
a keystone distortion correction processing unit for correcting a keystone distortion of an image projected by said projection lens,
wherein said acceleration sensor outputs a signal having a different output level in accordance with an angle between the optical axis of said projection lens and a horizontal surface,
wherein said determination unit determines an inclination of the optical axis of said projection lens relative to said horizontal surface in accordance with a difference of output levels of said acceleration sensor before and after said housing moves, and
wherein said keystone distortion correction processing unit corrects said keystone distortion in accordance with the inclination determined by said determination unit.

4. A projector system comprising:
a projector having a projection lens in which a focus lens is movable along an optical axis; and
a projection structure body on which an image is projected by said projection lens and which is movable,
wherein said projection structure body comprises an acceleration sensor for detecting acceleration of said projection structure body, and
wherein said projector comprises:
a focus adjustment unit for moving said focus lens;
a determination unit for determining whether said projection structure body is in a stationary state or in a moving state in accordance with an output of said acceleration sensor, and for determining a direction to which said projection structure body has moved and a distance that said projection structure body has moved in accordance with an output of said acceleration sensor when said projection structure body is in the moving state; and a control unit for determining a direction and a distance that said focus lens is to be moved in accordance with the direction and the distance that said projection structure body has moved, which are supplied from said determination unit and for controlling movement of said focus lens by said focus adjustment unit in accordance with the determined direction and the determined distance of said focus lens.

5. The projector system according to claim 4, wherein said projector further comprises a range sensor that can measure a projection distance from said projection lens to said projection structure body, and wherein said control unit controls movement of said focus lens by said focus adjustment unit in accordance with the projection distance measured by said range sensor when said determination unit determines that said projection structure body is in the stationary state.

6. The projector system according to claim 4, wherein said projector further comprises a keystone distortion correction processing unit for correcting a keystone distortion of an image projected by said projection lens, wherein said acceleration sensor outputs a signal having a different output level in accordance with an angle between an axis vertical to a projection surface of said projection structure body and a horizontal surface, wherein said determination unit determines an inclination of said axis perpendicular to a projection surface relative to said horizontal surface in accordance with the difference of output levels of said acceleration sensor before and after said projection structure body moves, and wherein said keystone distortion correction processing unit corrects said keystone distortion in accordance with the inclination determined by said determination unit.

7. A projector system comprising:

a projector having a projection lens in which a focus lens is movable along an optical axis; and a projection structure body on which an image is projected by said projection lens and which is movable, wherein said projection structure body comprises a first acceleration sensor for detecting acceleration of said projection structure body, and wherein said projector comprises:

a focus adjustment unit for moving said focus lens;

a second acceleration sensor for detecting acceleration of a housing in which said projection lens is arranged;

a determination unit for determining whether said projection structure body is in a stationary state or in a moving state in accordance with an output of said first acceleration sensor, and for determining a direction to which said projection structure body has moved and a distance that said projection structure body has moved in accordance with an output of said first acceleration sensor when said projection structure body is in the moving state, and for determining whether said housing is in a stationary state or in a moving state in accordance with an output of said second acceleration sensor and for determining a direction to which said housing has moved and a distance that said housing has moved in accordance with an output of said second acceleration sensor when said housing is in the moving state; and a control unit for determining a direction and a distance that said focus lens is to be moved in accordance with the direction and the distance that said projection structure body has moved, the direction and the distance that said housing has moved, or each those direction and distance of said projection structure body and said housing, which are supplied from said determination unit and for controlling movement of said focus lens by said focus adjustment unit in accordance with the determined direction and the determined distance of said focus lens.

8. The projector system according to claim 7, wherein said projector further comprises a range sensor that can measure a projection distance from said projection lens to said projection structure body, and wherein said control unit controls movement of said focus lens by said focus adjustment unit in accordance with the projection distance measured by said range sensor when said determination unit determines that both said projection structure body and said housing are in the stationary state.

9. The projector system according to claim 7, wherein said projector further comprises a keystone distortion correction processing unit for correcting a keystone distortion of an image projected by said projection lens, wherein said first acceleration sensor outputs a signal having a different output level in accordance with an angle between an axis perpendicular to a projection surface of said projection structure body and a horizontal surface, wherein said second acceleration sensor outputs a signal of a different output level in accordance with an angle between the optical axis of said projection lens and said horizontal surface, wherein said determination unit determines a first inclination of the axis vertical to said projection surface relative to said horizontal surface in accordance with a difference of output levels of said first acceleration sensor before and after said projection structure body moves, and determines a second inclination of the optical axis of said projection lens relative to said horizontal surface in accordance with a difference of output levels of said second acceleration sensor before and after said housing moves, and wherein said keystone distortion correction processing unit corrects said keystone distortion in accordance with the inclination determined by said determination unit when at least one of said first and second inclinations is determined in said determination unit.

10. A focus adjustment method for a projector including a projection lens in which a focus lens is movable along an optical axis and an acceleration sensor for detecting acceleration of a housing in which said projection lens is arranged, said method comprising:

determining whether said housing is in a stationary state or in a moving state in accordance with an output of said acceleration sensor;

respectively obtaining a direction to which said housing has moved and a distance that said housing has moved in accordance with an output of said acceleration sensor when said housing is in the moving state;

determining a direction and a distance that said focus lens is to be moved in accordance with the determined direction and the determined distance of said housing; and moving said focus lens based on prediction control, while the housing moves, in accordance with the determined direction and the determined distance of said focus lens.

11. The focus adjustment method for the projector according to claim 10, further comprising:

measuring a projection distance from said projection lens to a projection surface on which an image is projected by said projection lens, when said housing is in the stationary state; and moving said focus lens in accordance with said projection distance, which has been measured.

12. The focus adjustment method for the projector according to claim 10, further comprising:
  comparing output levels of said acceleration sensor before and after said housing moves;
  determining, when there is a difference of the output levels, an inclination of an axis vertical to said projection surface relative to said horizontal surface in accordance with said difference; and
  correcting a keystone distortion in the image projected by said projection lens in accordance with said inclination.

13. A focus adjustment method performed in a projector system including a projector having a projection lens in which a focus lens is movable along an optical axis and an acceleration sensor for detecting acceleration of a housing in which said projection lens is arranged, a projection structure body on which an image is projected by said projection lens and which is movable, and another acceleration sensor for detecting acceleration of said projection structure body, comprising:
  determining whether said housing is in a stationary state or in a moving state in accordance with an output of said acceleration sensor;
  obtaining a direction to which said housing has moved and a distance that said housing has moved in accordance with an output of said acceleration sensor when said housing is in the moving state;
  determining a first direction and a first distance that said focus lens is to be moved in accordance with the determined direction and the determined distance of said housing;
  moving said focus lens in accordance with the first direction and the first distance of said focus lens, which has been determined;
  determining whether said projection structure body is in a stationary state or in a moving state in accordance with an output of said another acceleration sensor;
  obtaining a direction to which said projection structure body has moved and a distance that said projection structure body has moved in accordance with an output of said another acceleration sensor when said projection structure body is in the moving state;
  determining a second direction and a second distance that said focus lens is to be moved in accordance with the determined direction and the determined distance of said projection structure body; and
  moving said focus lens in accordance with the second direction and the second distance of said focus lens, which has been determined.

14. The focus adjustment method for the projector according to claim 13, further comprising:
  measuring a projection distance from said projection lens to said projection structure body when both said housing and said projection structure body are in the stationary state; and
  moving said focus lens in accordance with said projection distance, which has been measured.

15. The focus adjustment method for the projector according to claim 13, further comprising:
  determining a first inclination of an optical axis of said projection lens relative to a horizontal surface in accordance with a difference of output levels of said acceleration sensor before and after said housing moves;
  correcting a keystone distortion in an image projected by said projection lens in accordance with said first inclination;
  determining a second inclination of an axis perpendicular to said projection surface in accordance with a difference of output levels of said another acceleration sensor before and after said projection structure body moves; and
  correcting the keystone distortion in the image projected by said projection lens in accordance with said second inclination.

16. The projector according to claim 1, wherein said control unit starts to move said focus lens, when the housing starts to move and before the housing stops moving.

17. The projector according to claim 1, wherein said projector is integrated in a projector system, said projector system comprising:
  a movable projection structure body on which an image is projected by said projection lens, and
  wherein said projection structure body comprises another acceleration sensor for detecting acceleration of said projection structure body.

18. The projector according to claim 17, wherein said determination unit further determines whether said projection structure body is in a stationary state or in a moving state based on a detection of said another acceleration sensor, and determines a direction to which said projection structure body has moved and a distance that said projection structure body has moved, based on a detection of said another acceleration sensor when said projection structure body is in the moving state, 19. The focus adjustment method for the projector according to claim 10, wherein said moving said focus lens is performed when the housing starts to move and before the housing stops moving.

20. The focus adjustment method for the projector according to claim 10, wherein said projector is integrated in a projector system that includes a movable projection structure body on which an image is projected by said projection lens, and another acceleration sensor for detecting acceleration of said projection structure body, and
  wherein said focus adjustment method further comprises:
    determining whether said projection structure body is in a stationary state or in a moving state based on detection an output of said another acceleration sensor;
    obtaining a direction to which said projection structure body has moved and a distance that said projection structure body has moved based on detection of an output of said another acceleration sensor when said projection structure body is in the moving state;
    determining another direction and another distance that said focus lens is to be moved in accordance with the determined direction and the determined distance of said projection structure body; and
    moving said focus lens in accordance with said another direction and said another distance of said focus lens, which has been determined.

* * * * *